United States Patent

Somer

[15] 3,676,676
[45] July 11, 1972

[54] LOW ENERGY PARTICLE COUNTER WITH TWO-DIMENSIONAL POSITION SENSING

[72] Inventor: Toivo A. Somer, Lake Orion, Mich.
[73] Assignee: The Bendix Corporation
[22] Filed: Oct. 30, 1970
[21] Appl. No.: 85,593

[52] U.S. Cl. ............................................250/83 R, 250/207
[51] Int. Cl. .............................................................G01t 1/16
[58] Field of Search...............250/41.90, 49.5 E, 71.5, 83 C, 250/83.3 R, 83.3 H, 83.3 HD, 203, 207, 211 K, 220 M, 213 PT; 313/103; 356/206, 229

[56] References Cited

UNITED STATES PATENTS

| | | | |
|---|---|---|---|
| 3,488,494 | 1/1970 | Tobias | 250/49.5 E |
| 3,240,931 | 3/1966 | Wiley et al. | 250/419 D |
| 3,244,889 | 4/1966 | Preston et al. | 250/220 M X |

Primary Examiner—Walter Stolwein
Assistant Examiner—Davis L. Willis
Attorney—Plante, Hartz, Smith and Thompson

[57] ABSTRACT

A system for detecting radiant energy, such as photons or charged particles, and yielding an output which is indicative of the position in the $x, y$ plane of the input surface of the detection element at which the energy impacts the detection element. The system includes a radiation detector which is subjected to the radiant energy and which yields an output charge in response thereto. The output charge energizes a plurality of charge sensitive elements which give an indication of the position at which the radiant energy impacts the detection element in one direction. A second plurality of charge sensing elements is also energized by the output charge to yield a position indication in the other direction. The individual outputs from the two pluralities of charge sensitive elements can, therefore, be combined to indicate the position along two orthogonal axes at which the detected radiant energy impacted the radiation sensitive element.

9 Claims, 2 Drawing Figures

INVENTOR
TOIVO A. SOMER

ATTORNEY

INVENTOR
TOIVO A. SOMER

BY

ATTORNEY

LOW ENERGY PARTICLE COUNTER WITH TWO-DIMENSIONAL POSITION SENSING

CROSS-REFERENCE TO RELATED CASES

This invention is an improvement of the invention described in application Ser. No. 85,592, filed of even date herewith by Toivo A. Somer, entitled, "Low Energy Particle Counter With One-Dimensional Position Sensing," and assigned to the assignee of the instant invention.

BACKGROUND OF THE INVENTION

Various types of radiation detection systems are presently available in the art. Ordinarily, such systems include an element, such as an electron multiplier, which yields an output consisting of an avalanche of charged particles in response to the reception of radiation upon the input surface of the element. Such detection systems also include an anode which receives the total charge exiting from the detection device. The total charge present upon the anode is then detected and measured and is an indication of the radiation which initially impinged upon the input surface to the electron multiplier Devices for the detection of photons and charged particles which are presently available in the art can be divided into two categories. The first category includes devices which are useful in the detection of high energy radiation. In this type of device the radiation sensitive detection element includes a window which is relatively transparent to the radiation to be detected. Because the radiation is high energy, it passes through the window even though the passage through the window may attenuate the intensity of the radiation.

The second category of devices includes those which are useful in detecting low energy radiation. This type of device suffers a major disadvantage because the radiation energy is low, and therefore the attenuation of a window is significant and accordingly frequently prevents a useful detection of the energy. Accordingly, the prior art devices useful in detecting low energy radiation ordinarily do not include a window. Instead the low energy radiation impinges directly upon the energy detection device, thereby eliminating the attenuation which would ordinarily be suffered because of the presence of the window. The instant invention falls into either of these categories of radiation detection systems.

SUMMARY OF THE INVENTION

The inventive system is capable of yielding an output which is indicative of the position of an impact of radiant energy upon the radiation detection element of the system. The position information is given in two dimensions with respect to surface of a plane. One embodiment of the inventive system includes an array of conductive parallel line anodes, which are spaced along one dimension of the detection device. Each of the parallel anodes is connected to an output indication device so that an output from one of the individual parallel anodes is indicative of the impact of a particle with one conductive anode. Because the location of the anode is known, the location of the impact in one direction along the surface of the detection element is also known.

A second array of parallel line anodes is spaced at a a suitable distance from the first array and is arranged so that the individual anodes within the two arrays are perpendicular to one another. The two arrays of parallel line anodes are at different potentials so that the charged particles impinging upon the first array will pass through this array and impinge upon the individual conductors of the second array.

Suitable output indication means are connected to the individual conductors of the second array so that an output from one of the readout means is indicative of an impact with a particular conductor within the second array and consequently the positioning of the impact of radiant energy along the other dimension of the radiation sensitive element is known.

The inventive system is, therefore, capable of yielding an output which is indicative of the positioning in two dimensions of the impact of radiant energy upon the multiplier input surface. Also, by counting the outputs received from all the parallel conductors within one of the arrays, the total number of particles which impinge upon the detector in a particular period of time can be determined.

Another embodiment utilizes a planar conductive surface which extends along the entire output surface of the detection element. A plurality of parallel linear resistive elements are physically displaced from the conductive surface so that charged secondary emission particles emanating from the output surface of the detector pass through the conductive layer and impinge upon the resistive elements.

The resistive elements are grounded at one end and virtually grounded at the other end. The virtual grounding is achieved by connecting each of the resistive elements to a low input impedance amplifier. Because of the grounding of both ends of the resistive elements, charges impacting with the elements split in accordance with the resistive ratio between the point of impact and the total resistance of the elements. The proportional charge serves as an input to a two input divider.

An output which is independent of the statistically variable total charge is obtained by inputting the total charge into the divider. The proportional charge is then divided by the total charge so that the total charge factor is eliminated.

DETAILED DESCRIPTION

Figure 1:
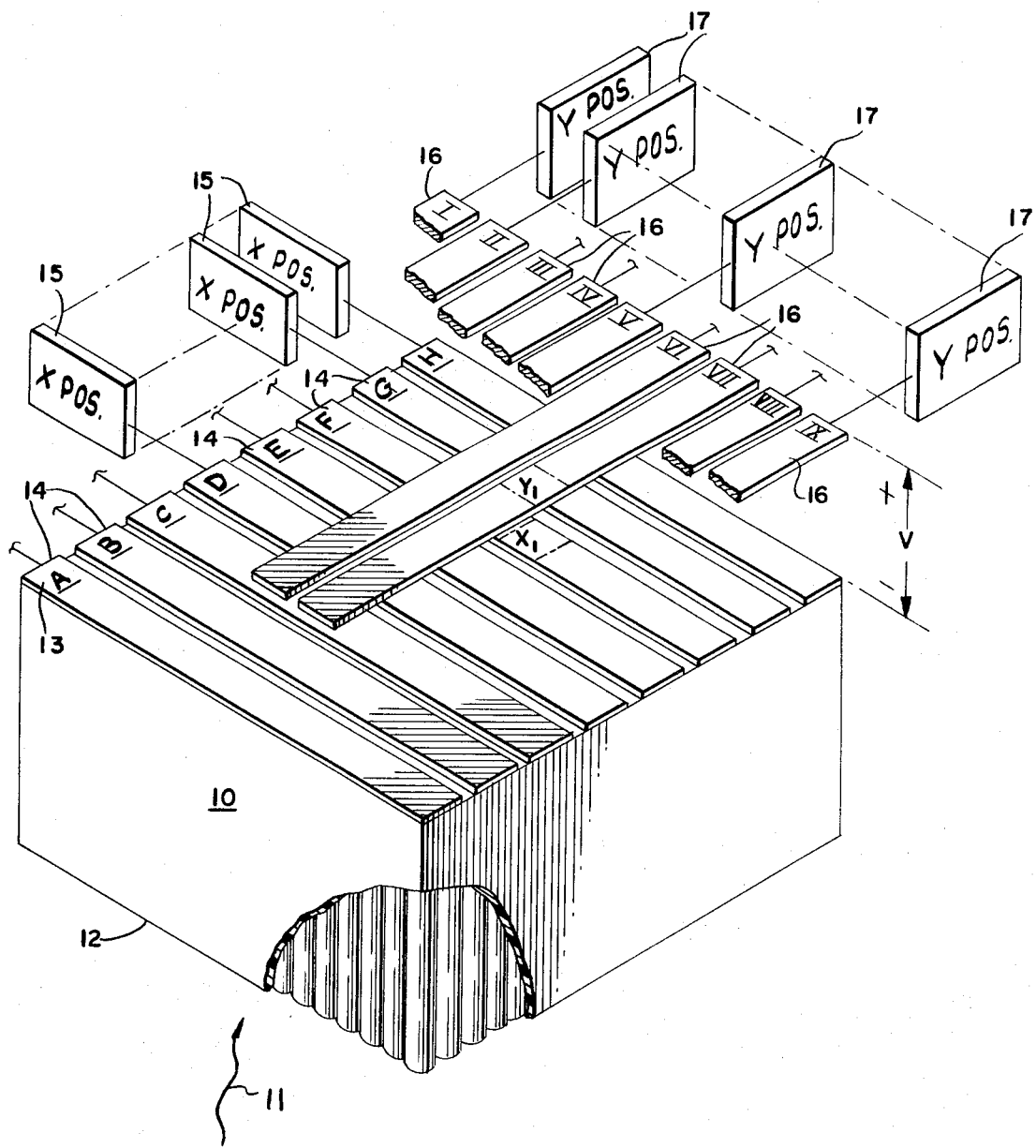
FIG. 1 is a first preferred embodiment of the instant invention in which a first array of parallel line detection elements is arranged perpendicular to a second array of parallel line detection conductors.

The preferred embodiment of the invention shown in FIG. 1 includes a photomultiplier 10, of a type known in the art. Radiant energy, indicated by the arrow 11, and which can be photons or charged particles, impinges upon the input surface 12 of the photomultiplier 10. In response to the impingement of the radiant energy 11, the electron multiplier 10 produces an avalanche of electrons which are ejected from the output surface 13 of the multiplier, because of the potential difference of $V_2$.

An exemplary photomultiplier which can be used is a spiraltron matrix, which is described in pages 376–380 of the IEEE, "Transactions on Nuclear Science," Volume NS–16, No. 1, February, 1969, in an article entitled, "Spiraltron Matrixes as Windowless Photo Detectors for Soft X-Ray and Extreme U. V.," by T. A. Somer and P. W. Graves.

An array of conductive parallel anodes 14 is evaporated or otherwise applied to the photomultiplier output surface 13 to permit output detection along the lengths of the parallel line anodes. The parallel line anodes 14 are placed at a potential which is more positive than the potential of the input surface 12 of matrix 10.

A suitable output detection means 15 of a type well known in the art, such as a pulse amplifier-counter, is connected to each of the individual parallel line conductors 14 so that the charge present on each conductor is individually detected. Accordingly, by properly identifying the parallel line conductors 14, for example alphabetically as shown in FIG. 1, the position along an axis at which the charges leave the output surface 13 is indicated by the readings on the individual readout means 15. The total number of charges which impinge upon the several conductors forming an array in a selected time period can be determined simply by counting the number of indications presented by the detectors 15 in the selected time period.

A second array of parallel line conductors 16 is physically spaced from the first array of parallel conductors 14. The individual conductors of the second array are numbered I to IX.

The array of parallel line conductors 16 can be physically supported in the spaced relationship by an insulating or dielectric member which is of a type within the purview of one skilled in the art.

A voltage source V, which is used to maintain the second array of parallel conductors 16 at a more positive potential with respect to the first plurality of parallel conductors 14, is arranged across the two arrays of parallel conductors. Accordingly, the electrons emanating from the output surface 13 of the photomultiplier 10 will pass through the conductors 14 and impact with the conductors 16. Consequently, the charges impacting the various conductors I–IX will yield output indications on the output readout means 17. These outputs are indicative of impact positions along the y axis of the input surface 12 of matrix 10. Accordingly, by using the two arrays of parallel conductors and by perpendicularly arranging the individual conductors in the two arrays so that a grid-like element is formed, it is possible to determine the exact position along the x and y axes of the output surface 13 from which the electrons emanated. This position indicates the position on the input surface 12 at which the initial energy impacted with the photomultiplier 16. As an example, if a reading is simultaneously present on the x axis, conductor G and the y axis conductor V, it is immediately known that an electron emanated from the output surface 13 in the position identified as G–V. Radiation must, therefore, have impinged upon the matrix 10 at a corresponding point on input surface 12. It is, therefore, possible to very precisely locate the position in two dimensions at which the radiant energy impinged upon the input surface 12 of the photomultiplier 10. Furthermore, by counting the number of readouts obtained from all the conductors of one of the arrays of parallel conductors obtained in a selected time period, it is possible to determine the total number of particles which impacted with the input surface 12 of the photomultiplier 10 during the selected time period. The inventive system is therefore a significant step forward in the art, in that it yields a two-dimensional position indication, as well as a total particle impingement indication.

Figure 2:
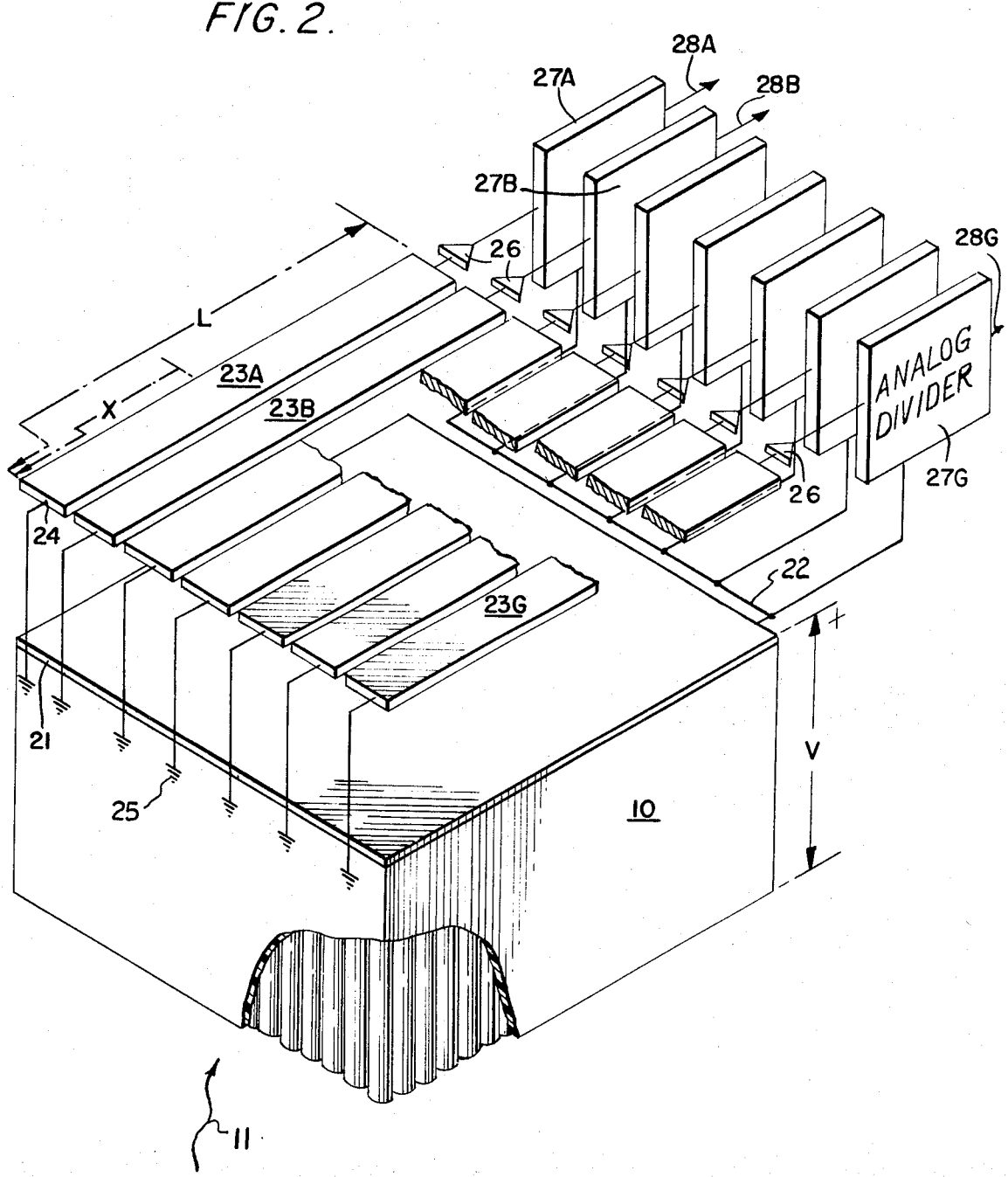
FIG. 2 is a second preferred embodiment which utilizes a single array of parallel line conductors and charge division techniques to yield a two-dimensional position indicating output.

The embodiment of FIG. 2 is similar to that of FIG. 1 in that it utilizes the same photomultiplier 10 and a similar input surface 12. However, the output surface 21 is covered with a continuous planar surface 21 so that the secondary emission charges emanating from the output surface 13 are not indicative of the position from which the charged particles emanate. Accordingly, the secondary emission charges emanating from the output surface 21 cause a voltage on the lead 22 which is electrically connected to a corresponding input on the analog divider 27. The lead 22 is maintained at a potential which is more positive than the input surface 12 of the photomultiplier 10.

Physically displaced from the planar output 21 is a plurality of parallel linear resistance elements 23. One end 24 of each of the parallel linear resistance elements 23 is grounded as indicated at 25. The other end of each of the linear resistive elements 23 is individually connected to an amplifier 26 having very low, or essentially zero, input impedance. Each of the low impedance amplifiers 26 is connected to one of the inputs of dual input analog dividers 27. Accordingly, each of the analog dividers 27 receives an input which is indicative of the charge impinging upon one of the parallel linear resistive elements 23. That is, the resistive element 23A serves as an input to the analog divider 27A while the resistive element 23B serves as an input to the analog divider 27B. Accordingly, the position along the x axis of the output surface 21 of the photomultiplier 10 at which a charged particle emanates is evidenced by an indication on one of the output leads of an analog divider 27. As an example, an output on output lead 28A of analog divider 27A indicates that an electron impacted the resistive element 23A. This is an x axis position indication of an impact on the input surface 12 of the photomultiplier 10.

The y axis position indication is obtained from the use of charge division techniques which are possible because of the utilization of linear resistive elements for the parallel conductors 23. Each of the analog dividers 27 has a second input which is connected to the output lead 22 which receives a voltage because of the secondary emission charges emanating from the output surface 21 of the photomultiplier. Each of the linear resistive elements 23 is grounded at one end, as indicated by reference number 25. The other end of each of the linear resistance elements 23 is connected to an amplifier 26. The amplifiers 26 have virtually zero input impedance and, therefore, both ends of the conductors 23 can be considered as grounded. The total charge impacting each of the individual linear resistive elements 23 is therefore divided in accordance with the relationship:

$$(Y/L)Q$$

where:
Y = the distance from the grounded end 24 to the position at which the electron impacts the linear resistive element 23;
L = the total length of the conductor; and
Q = the total charge striking that conductor.

Because the amplifiers 26 have essentially zero input impedance, the charges striking each conductor divide in accordance with the Y/L ratio. Consequently, by utilizing the analog dividers 27 to divide the total charge Q received by anode 21 into the (Y/L)Q ratio, the dependence of the output upon the charge Q is eliminated. The output voltage of each divider is indicative of the Y position along the various linear resistive elements 23, at which energy impinged upon the matrix input surface 12.

The output of each of the analog dividers 27 is therefore indicative of the two-dimensional position of the impact of radiant energy upon the input surface 12 of the photomultiplier 10. For example, an output on output lead 28A of divider 27A immediately indicates that energy impacted the input surface 12 of the photomultiplier 10 somewhere along the length of the linear resistive element 23A. This yields the x coordinate information relative to the impact. The y coordinate information is obtained from the amplitude of the pulse present on the output lead 28A.

The embodiments of the inventive system illustrated in FIGS. 1 and 2 are therefore seen to be advantageous over the art systems in that they yield two-dimensional position information relative to the position at which radiant energy impacts the input surface of a spiraltron matrix or a photomultiplier.

The embodiment of FIG. 2 is advantageous over that of FIG. 1 because the need for the x axis readout means 15 is eliminated. However, FIG. 2 requires the use of dividers 27 and amplifiers 26, which may in some instances be undesirable. The total teaching of the two embodiments is very flexible, allowing a selection of methods which is most advantageous in view of the particular application and availability of elements.

What is claimed is:

1. A two-dimensional position indicating system for detecting radiant energy comprising:
an energy detection element having an input surface and an output surface, a plurality of charged particles emanating from said output surface in response to the impact of a single particle of radiant energy with said input surface;
a first plurality of spaced conductors in the proximity of said output surface and extending completely along one dimension of said output surface, said conductors being subjected to said charged particles emanating from said output surface;
a second plurality of spaced conductors extending completely along another dimension of said output surface and perpendicular to said first plurality of conductors, and physically displaced from and in the proximity of said first plurality of conductors, said second plurality of conductors being subjected to said charged particles as they pass through said first conductors; and readout means responsive to the charges impinging upon said first and second conductors to yield an output indicative of the two-dimensional location at which said radiation impacted said input surface.

2. The system of claim 1 wherein said readout means includes a first plurality of readout units equal to said first plurality of conductors and individually responsive to the outputs of said first conductors so that individual indications of said first readout units are indicative of the position of impacts of energy with said input surface along said one dimension; and a second plurality of readout units equal to said second plurality of conductors and individually responsive to the outputs of said second conductors so that individual indications of said second readout units are indicative of the position of impacts of energy with said input surface along said another dimension.

3. The system of claim 1 wherein said first plurality of conductors are individually identified along a $y$ axis of said output surface and said second plurality of conductors are individually identified along an $x$ axis of said output surface so that each charged particle emanating from said output surface impacts one conductor in each of said first and second pluralities and yields outputs respectively having an $x$–$y$ address.

4. The system of claim 1 wherein said energy detection element is an electron multiplier and said first plurality of spaced conductors is evaporated onto said output surface in the configuration of uniformably spaced parallel conductive lines arranged perpendicular to said second plurality of conductors.

5. A two-dimensional position indicating system for detecting radiant energy comprising:

an energy detection element having an input surface and an output surface, a plurality of charged particles emanating from said output surface in response to the impact of a single particle of radiant energy upon said input surface;

a plurality of linear resistive elements having a length extending along one dimension of said output surface and arranged along the other dimension of said output surface, said resistive elements being physically displaced from and in the proximity of said detection surface, said resistive elements also being responsive to said charged particles as they pass through said detection surface, said resistive elements serving to split the charges received from said detection surface in accordance with a ratio determined by the linear position at which said charges impact said resistive elements; and a plurality of readout means individually responsive to said linear resistive elements and responsive to said detection surface to yield an indication of the two-dimensional locations at which said charged particles emanate from said output surface.

6. The system of claim 5 wherein said readout means includes a plurality of low input impedance amplifiers individually responsive to said resistive elements;

a plurality of dividers individually responsive to said amplifiers so that an output from one of said dividers is indicative of the position of energy impact on said input surface along one dimension of said input surface and the amplitude of said divider output is indicative of the position of energy impact with said input surface along a second dimension of said input surface.

7. The system of claim 6 wherein one end of each of said resistive elements is directly grounded and the other end of each of said resistive elements is relatively grounded through one of said amplifiers; and said dividers are two input analog dividers.

8. The system of claim 6 wherein one input of each of said dividers is responsive to said conductive surface and the other input of said dividers is individually responsive to said resistive elements.

9. The system of claim 8 wherein said ratio is Y/L where:

Y = the distance between the point of input of said particle and said grounded end;

L = the total length of said resistive element.

* * * * *